(No Model.)

J. C. BARRY.
SPRING VEHICLE.

No. 358,530. Patented Mar. 1, 1887.

Witnesses
Preston Phelps
O. Wallace

Inventor
John C. Barry
By his Attorney
M. D. Peck

UNITED STATES PATENT OFFICE.

JOHN C. BARRY, OF CORTLAND, NEW YORK.

SPRING-VEHICLE.

SPECIFICATION forming part of Letters Patent No. 358,530, dated March 1, 1887.

Application filed October 8, 1886. Serial No. 215,717. (No model.)

*To all whom it may concern:*

Be it known that I, JOHN C. BARRY, a citizen of the United States, residing at Cortland, in the county of Cortland and State of New York, have invented certain new and useful Improvements in Spring-Vehicles; and I do hereby declare the following to be a full, clear, and exact description of the invention, such as will enable others skilled in the art to which it appertains to make and use the same, reference being had to the accompanying drawings, which form part of this specification.

My invention relates to a new and improved construction of side springs for vehicles, and has for its object to lessen the tendency to rocking or tilting of the box lengthwise and from side to side, and to produce a much easier-riding carriage than heretofore made by the elongation attachment and peculiar combination of springs; and it consists in the construction hereinafter described, and more particularly pointed out in the claim.

Figure 1:
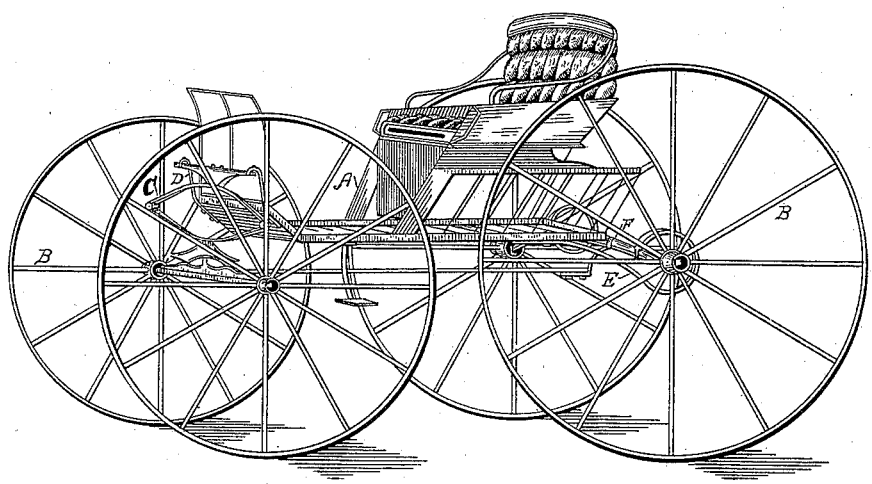
Figure 2:
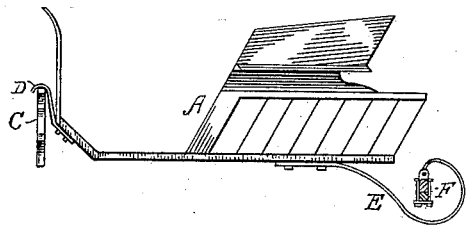
Figure 3:
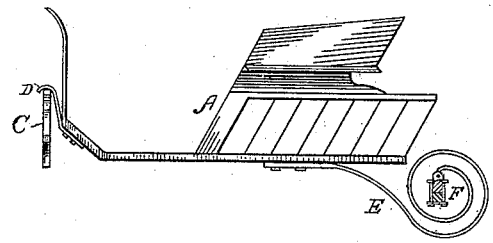

Referring to the drawings, Figure 1 is a perspective view of a vehicle with my improvement attached thereto. Fig. 2 is a sectional view showing the attachment of scroll-spring to the hind axle, and Fig. 3 shows a modified form of my scroll-spring.

Like letters refer to corresponding parts in each figure of the drawings.

A refers to the body, which is constructed so as to rest directly upon the springs and to avoid the necessity of side bars, and B B represent the wheels, which are of ordinary construction.

C is an elliptic spring, which is attached to the bolster or head-block in front, and is placed crosswise the body, and supports the front end thereof by means of hooks D, secured to the under side of the body.

Between the central and rear end there is secured directly to the under side of the body, by bolts at or near each edge, springs E, the rear portions of which are in the form of a scroll, or C-shaped. These springs extend downward and backward from their attachment to the body under the hind axle and are curved around the rear portion and attached to the top of the axle F by immovable pivots. The flexibility and ease of the springs may be extended by forming the scrolls so that they shall pass one or more times entirely around the axle, as shown in Fig. 3, and attach the ends of the springs, as before described, to the top of the axle.

The springs E may be re-enforced by leaves when used with bodies of sufficient weight to require a stronger spring than is made from a single thickness of steel. By this construction of scroll springs attached directly to the body and upper side of the axle it permits of a much greater elongation of the spring, which gives a more free and easy vertical movement of the body of the carriage, and, in connection with the elliptic spring in front secured directly to the axle and under side of the body, I am enabled to dispense with the side bars and semi-elliptic springs ordinarily used with them, which are objectionable on account of the jarring and jolting motion produced when in use, and to provide a vehicle with a much less tendency to rocking or tilting of the body lengthwise, and to produce a much easier-riding carriage than has heretofore been made.

Having fully described my invention, what I claim as new, and desire to secure by Letters Patent of the United States, is—

The combination, with a wagon-body having a cross-elliptic spring in front secured directly to the body and axle, of scroll-springs in the rear attached to the under side of the body and extending back under the front and behind the axle, and secured to the top thereof, substantially as and for the purpose set forth.

In testimony whereof I affix my signature in presence of two witnesses.

JOHN C. BARRY.

Witnesses:
C. W. STOKER,
J. H. TRUE.